United States Patent
Kamiyama et al.

(10) Patent No.: US 8,276,646 B2
(45) Date of Patent: Oct. 2, 2012

(54) APPARATUS FOR MANUFACTURING ROTOR FOR ROTATING ELECTRIC MACHINE

(75) Inventors: Masahiko Kamiyama, Kanuma (JP); Kunitoshi Sugaya, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 137 days.

(21) Appl. No.: 12/935,954

(22) PCT Filed: Mar. 13, 2009

(86) PCT No.: PCT/JP2009/054907
§ 371 (c)(1),
(2), (4) Date: Oct. 1, 2010

(87) PCT Pub. No.: WO2009/122881
PCT Pub. Date: Oct. 8, 2009

(65) Prior Publication Data
US 2011/0024073 A1 Feb. 3, 2011

(30) Foreign Application Priority Data
Apr. 2, 2008 (JP) .................................. 2008-096240

(51) Int. Cl.
*B22D 17/24* (2006.01)
*B22D 33/04* (2006.01)
(52) U.S. Cl. ....................................... 164/340; 164/342

(58) Field of Classification Search .................. 164/339, 164/340, 341, 342, 369, 137
See application file for complete search history.

(56) References Cited

U.S. PATENT DOCUMENTS

| 4,747,573 A | 5/1988 | Nagashima | |
|---|---|---|---|
| 7,740,049 B2 | 6/2010 | Sakurai et al. | |
| 2008/0274289 A1* | 11/2008 | Sakurai et al. | 427/327 |

FOREIGN PATENT DOCUMENTS

| JP | 58-026549 | | 2/1983 |
|---|---|---|---|
| JP | 58-26549 A | * | 2/1983 |
| JP | 1-143755 | | 6/1989 |
| JP | 2000-224790 | | 8/2000 |
| JP | 2000-301312 | | 10/2000 |
| JP | 2001-275317 | | 10/2001 |
| JP | 2005-210790 | | 8/2005 |
| JP | 2006-000914 | | 1/2006 |

* cited by examiner

*Primary Examiner* — Kevin P Kerns
(74) *Attorney, Agent, or Firm* — Rankin, Hill & Clark LLP

(57) ABSTRACT

An apparatus for manufacturing a rotor for a rotating electric machine. The apparatus includes a movable mold and a stationary mold, and a cavity is formed between those molds. The movable mold includes a rotor core holding portion holding a rotor core, and a core arranging portion arranging a core removably. The core includes a base core and a plurality of split cores. The base core is equipped on its outer circumference with a remedy face, which is positioned in the inner circumference of the open end portion of a boss portion and extends in a mold-release direction of a casting, thereby blocking the deformation of the open end portion at the parting time.

2 Claims, 7 Drawing Sheets

APPARATUS FOR MANUFACTURING ROTOR FOR ROTATING ELECTRIC MACHINE

TECHNICAL FIELD

The present invention relates to an apparatus for manufacturing a rotor for use in rotary electric machines by casting a hollow boss radially inwardly of a hollow cylindrical rotor core.

BACKGROUND ART

Rotor cores for use in rotary electric machines are usually constructed of a stack of thin steel sheets. Since the rotor cores are of a hollow cylindrical shape, each of the thin steel sheets is cut from a steel sheet into an annular shape. However, as the scrap cut off from inside the annular sheet is wasted, use of the steel sheet suffers a low yield and is not economical.

In an attempt to utilize the steel sheet more extensively, there has been proposed a rotor including a rotor core which comprises a plurality of circumferentially separate core segments each in the form of an annular thin steel sheet (see, for example, Japanese Laid-Open Patent Publication No. 2000-224790). Each of the core segments has teeth and grooves on its circumferentially opposite ends. The core segments are interconnected into an annular rotor core with the teeth fitting in the grooves.

The core segments also have axial holes defined therein. Reinforcing fastening support members such as rivets or bolts are inserted through the axial holes and have opposite ends fixed to side plates, thereby securing the core segments to the side plates. However, the core segments secured to the side plates by the rivets or the bolts are not strong enough to be used in rotary electric machines which undergo large torques. Accordingly, the separate core segments tend to have difficulty being securely and stably used in rotary electric machines.

Japanese Laid-Open Patent Publication No. 2005-210790 discloses a rotary electric machine including a rotor which comprises a boss and a rotor core which are integrally formed of aluminum by casting. In the disclosed rotary electric machine, the boss is firmly coupled to the rotor core.

DISCLOSURE OF THE INVENTION

It is an object of the present invention to provide an apparatus for manufacturing a rotor for use in rotary electric machines by casting a hollow boss radially inwardly of a rotor core, the apparatus being capable of producing a boss having a simple and economical structure and accurate casting dimensions.

According to an aspect of the present invention, there is provided an apparatus for manufacturing a rotor for use in a rotary electric machine by casting a hollow boss radially inwardly of a cylindrical rotor core, comprising a first die for holding the rotor core, a second die for defining a cavity between the first die and the second die, and a core removably mounted in the first die, for forming the boss, the core having a correcting surface for being held against an inner circumferential surface of an open end of the boss, the correcting surface extending in a casting removal direction along which a casting is released, for preventing the open end from being deformed when the casting is released.

The core comprises a base core including a seat having the correcting surface on an outer circumferential surface thereof, and a support column extending from the seat in the casting removal direction, and a plurality of separate cores disposed around the support column. It is preferable that the support column may have a plurality of fins extending radially outwardly and in the casting removal direction and aligned with respective mating surfaces of the separate cores. The fins may have ridges disposed on at least one surface thereof and extending in the casting removal direction. The separate cores may have slots for receiving the ridges therein, the slots extending in the casting removal direction.

According to the present invention, the core has the correcting surface to be held against the inner circumferential surface of the open end of the boss. After a molten metal is introduced into the cavity and the casting is removed together with the core from the first die, the boss, particularly, the open end thereof, is reliably prevented from shrinking radially inwardly while the boss is being kept at high temperatures and not yet solidified. Therefore, the boss can maintain accurate casting dimensions. The apparatus for manufacturing the rotor is thus capable of producing the rotor as a casting efficiently and reliably. The apparatus is of a simple and economical structure, and the manufactured rotor has good dimensional accuracy.

The above and other objects, features, and advantages of the present invention will become more apparent from the following description when taken in conjunction with the accompanying drawings in which a preferred embodiment of the present invention is shown by way of illustrative example.

BEST MODE FOR CARRYING OUT THE INVENTION

Figure 1:
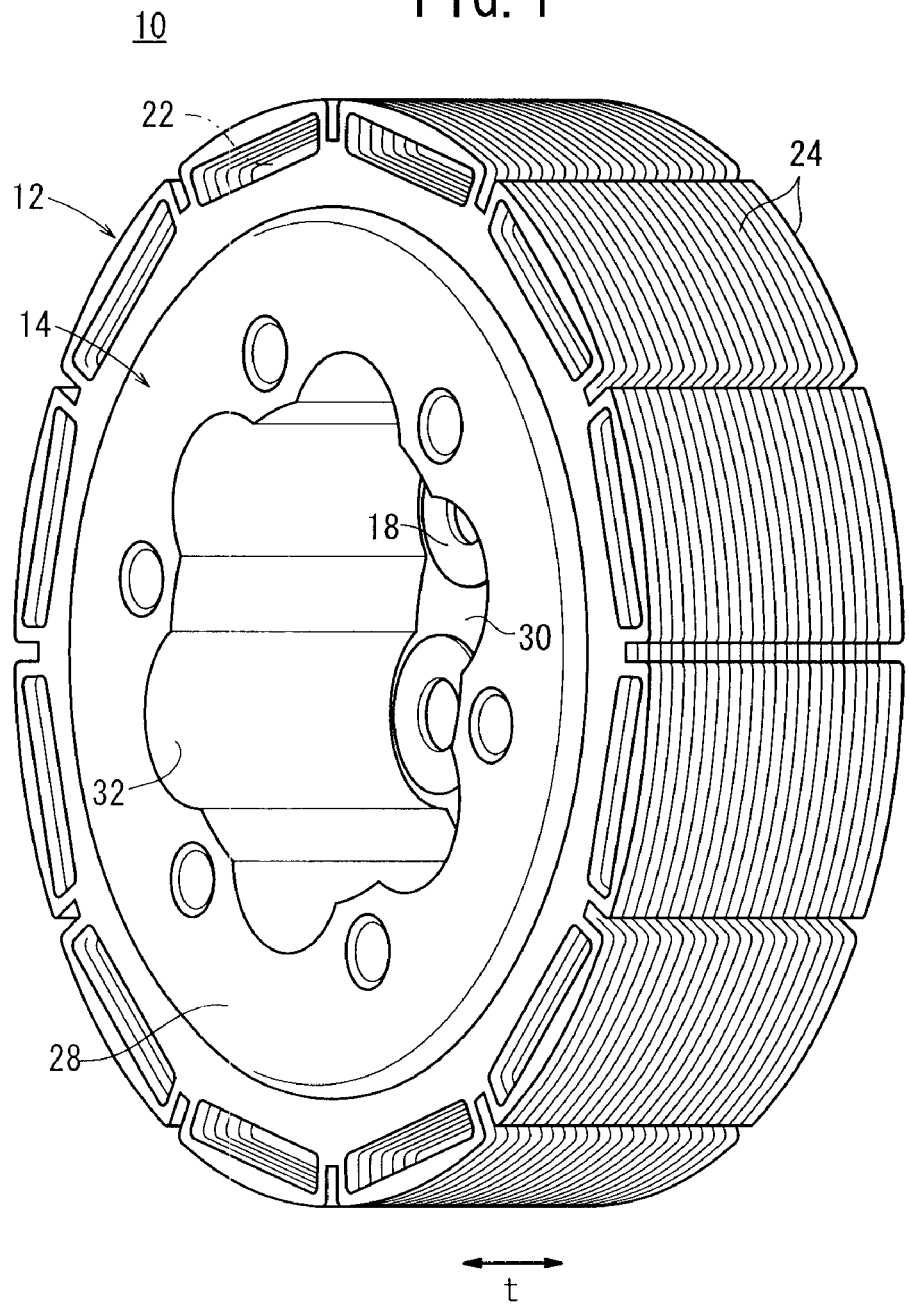
FIG. 1 is a perspective view of a rotor for use in a rotary electric machine which is manufactured by a manufacturing apparatus according to an embodiment of the present invention.
Figure 2:
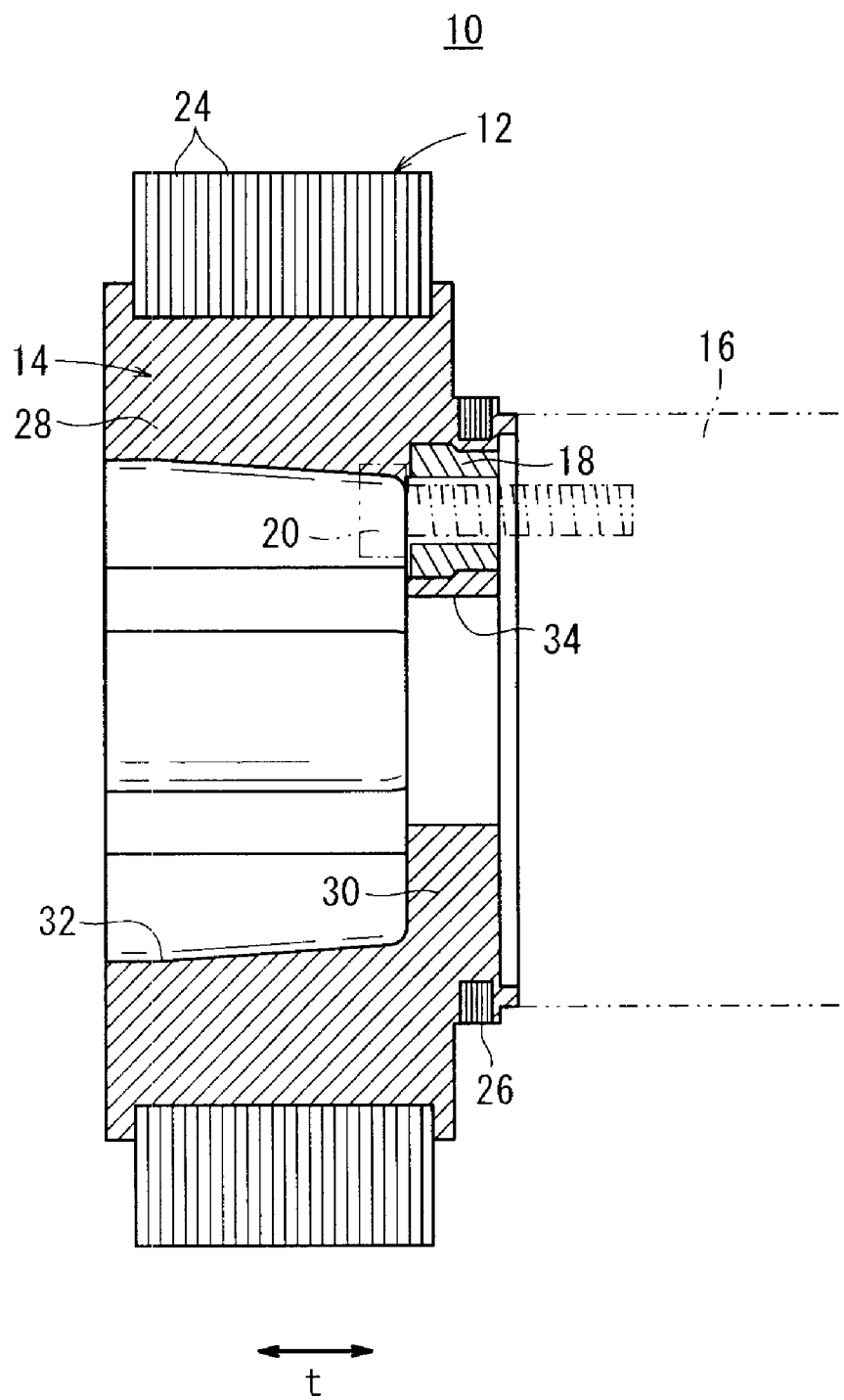
FIG. 2 is an axial cross-sectional view of the rotor.

FIG. 1 shows in perspective a rotor 10 for use in a rotary electric machine which is manufactured by a manufacturing apparatus according to an embodiment of the present invention. FIG. 2 shows the rotor 10 in cross section.

As shown in FIGS. 1 and 2, the rotor 10 comprises a hollow cylindrical rotor core 12, a boss 14 formed radially inwardly of the rotor core 12 by casting, and a shaft 16 fixedly mounted in the boss 14. When the shaft 16 operates as an output shaft or an input shaft, the rotary electric machine which incorporates the rotor 10 therein is used as an electric motor or an electric generator. The rotor 10 has an end fixed to an end of the shaft 16, by bolts 20 inserted through collars 18 and threaded into the shaft 16.

The rotor core 12 comprises three rotor core segments, for example, that are circumferentially interconnected each other, and accommodates a plurality of magnets 22 therein. Each of the rotor core segments comprises a plurality of thin steel sheets 24 stacked in the axial direction (indicated by the arrow t), providing a laminated iron core. On the end of the rotor 10 which is fastened to the shaft 16, there are mounted a plurality of thin steel sheets 26 which are stacked in the axial direction (indicated by the arrow t in FIG. 2), providing a laminated iron core.

The boss 14 is in the form of an aluminum casting, e.g., an aluminum die casting, produced by a manufacturing apparatus to be described later. The boss 14 includes a tubular member 28 joined to the rotor core 12, a bottom 30 disposed radially inwardly of the tubular member 28, and an open end 32 of the tubular member 28 which is axially opposite to the bottom 30. The bottom 30 has a central hole 34 defined therein which receives therein a protrusion on the end of the shaft 16. The collars 18 are disposed at equal angular intervals on the tubular member 28 around the central hole 34.

Figure 3:
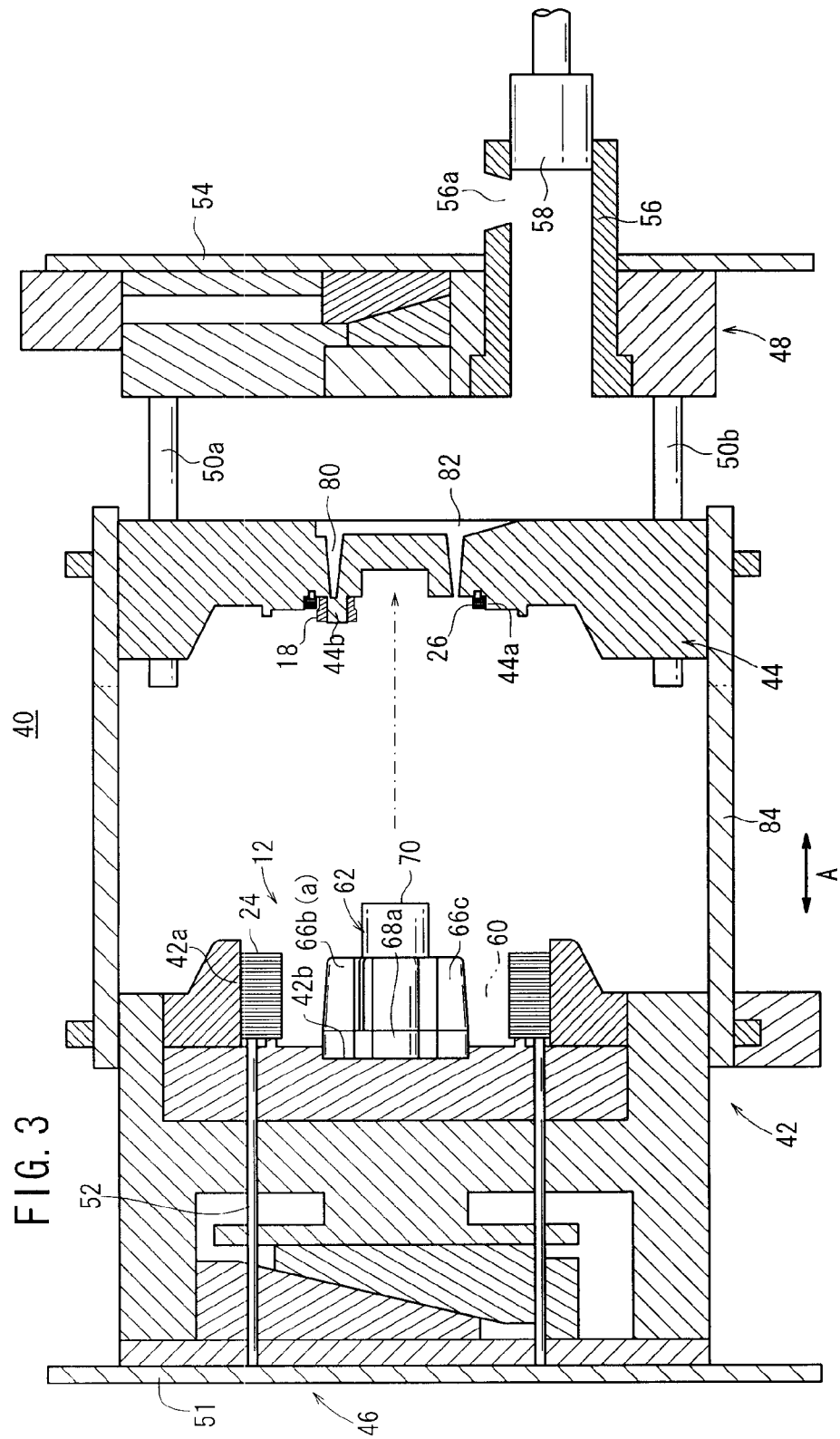
FIG. 3 is a schematic cross-sectional view of the manufacturing apparatus.

FIG. 3 shows in schematic cross section a manufacturing apparatus 40 according to an embodiment of the present invention.

As shown in FIG. 3, the manufacturing apparatus 40 comprises a movable die (first die) 42 and a fixed die (second die) 44 which jointly make up a die assembly. The movable die 42 is coupled to a movable die base 46, and the fixed die 44 is coupled to a fixed die base 48 by guide pins 50a, 50b.

The movable die base 46 includes a movable platen 51 supporting a pair of ejector pins 52 which extends through the movable die 42. The fixed die base 48 has a fixed platen 54 with an injection sleeve 56 mounted thereon. The injection sleeve 56 has a sprue 56a, and an injection tip 58 is axially movably disposed in the injection sleeve 56. When the movable die 42 and the fixed die 44 are clamped together, they jointly define a casting cavity 60 therebetween.

The movable die 42 includes a rotor core holder 42a for holding the laminated iron core that is made up of the thin steel sheets 24 of the rotor core 12, and a core assembly holder 42b for holding a core assembly 62 removably in the casting cavity 60.

Figure 4:
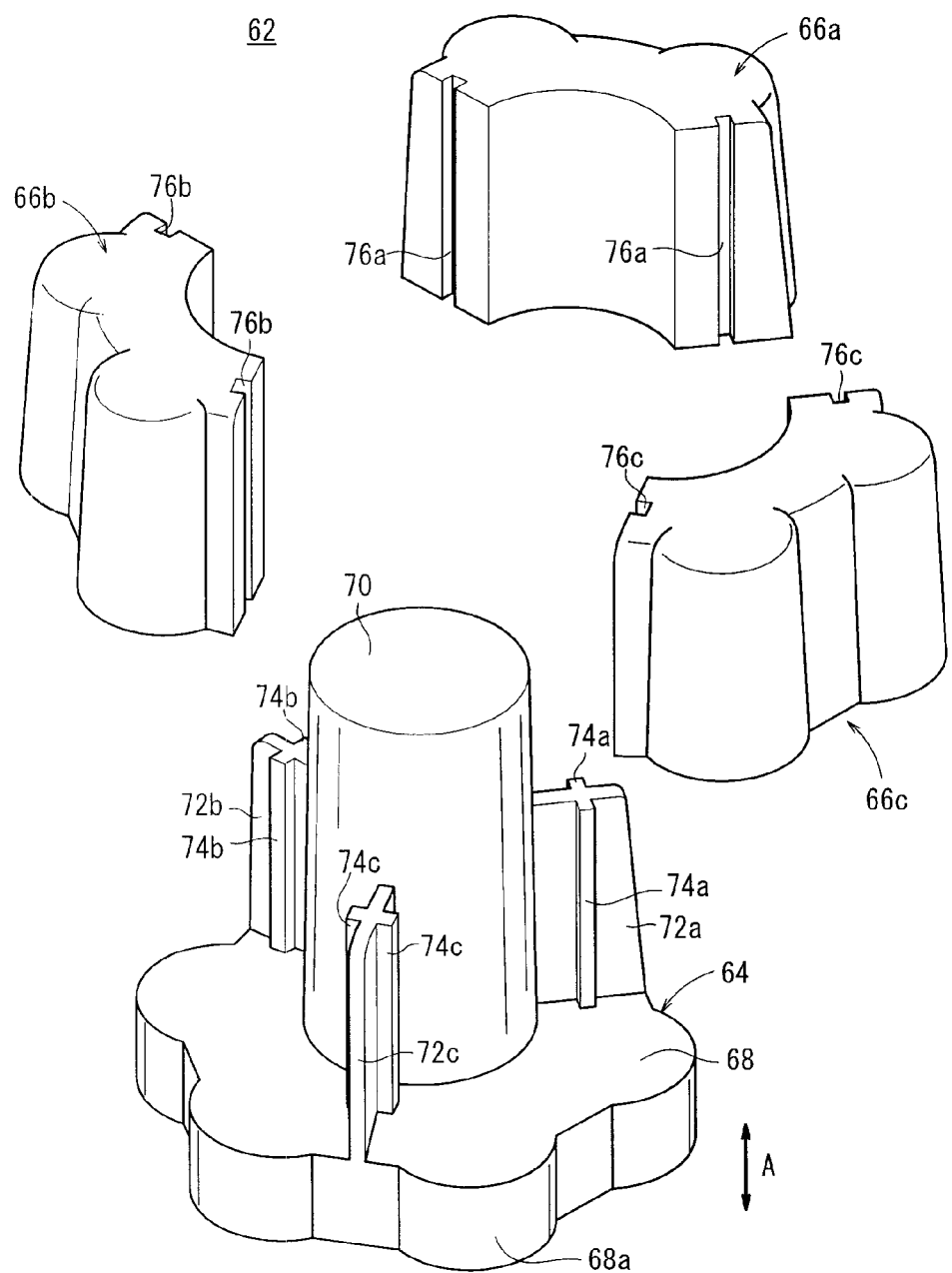
FIG. 4 is an exploded perspective view of a core assembly of the manufacturing apparatus.

As shown in FIG. 4, the core assembly 62 comprises a base core 64 and a plurality of, e.g., three, separate cores 66a, 66b, 66c. The base core 64 includes a seat 68 having on its outer circumferential surface a correcting surface 68a which is positioned in the inner circumferential surface of the open end 32 of the boss 14 and extends in the direction along which the casting will be released (casting removal direction), i.e., in the directions indicated by the arrow A, for preventing the open end 32 from being deformed when the casting is released, and a support column 70 extending axially centrally from the seat 68 in the casting removal direction.

On the outer circumference of the support column 70, the core assembly 62 also includes a plurality of, e.g., three, fins (plate-like portions) 72a, 72b, 72c extending radially outwardly and in the casting removal direction and aligned with respective mating surfaces of the separate cores 66a, 66b, 66c. Pairs of axial ridges 74a, 74b, 74c which extend in the casting removal direction are disposed on at least one surface, both surfaces in the present embodiment, of the fins 72a, 72b, 72c.

The separate core 66a has a pair of slots 76a defined respectively in the mating surfaces thereof for receiving the ridges 74a, 74b snugly therein, respectively. The separate core 66b has a pair of slots 76b defined respectively in the mating surfaces thereof for receiving the ridges 74b, 74c snugly therein, respectively. The separate core 66c has a pair of slots 76c defined respectively in the mating surfaces thereof for receiving the ridges 74c, 74a snugly therein, respectively.

As shown in FIG. 3, the fixed die 44 has an iron core holder 44a for holding the laminated iron core made up of the thin steel sheets 26, and collar holders 44b for holding the collars 18. The fixed die 44 also has gates 80 for fluid communication with the casting cavity 60 and a runner 82 for bringing the gates 80 into fluid communication with the injection sleeve 56. The movable die 42 and the fixed die 44 are coupled to each other by joint plates 84 such that they are movable relatively to each other over a predetermined distance.

Operation of the manufacturing apparatus 40 will be described below.

First, the separate cores 66a, 66b, 66c and the base core 64 are combined together into the core assembly 62. Specifically, the separate cores 66a, 66b, 66c are disposed around the support column 70 of the base core 64, with the fins 72a, 72b, 72c being sandwiched between the separate cores 66a, 66b, 66c. At this time, the ridges 74a, 74b, 74c on the opposite surfaces of the fins 72a, 72b, 72c are fitted in the slots 76a, 76b, 76c of the separate cores 66a, 66b, 66c.

Figure 5:
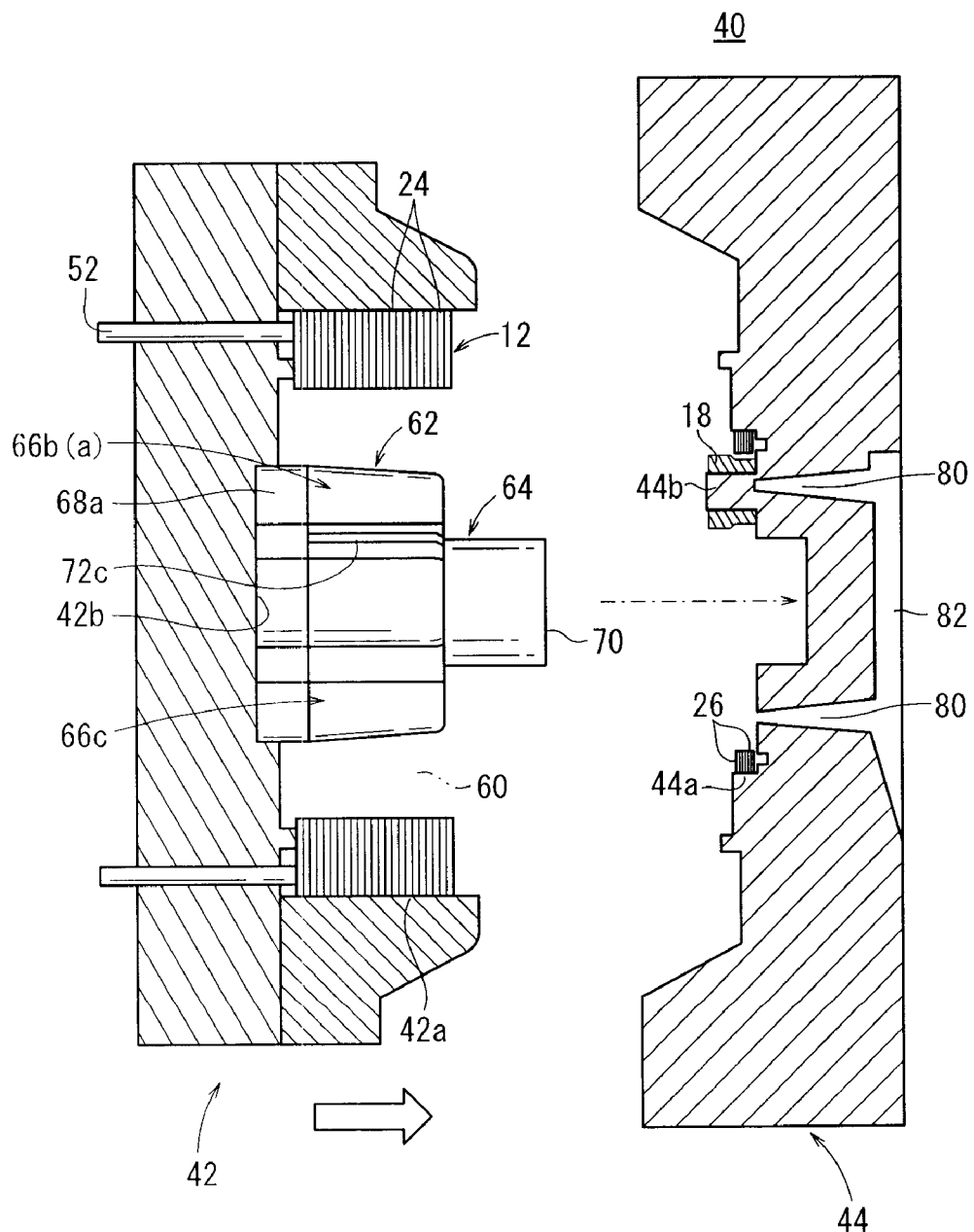
FIG. 5 is a cross-sectional view showing the manner in which the core assembly is placed in the manufacturing apparatus.

In this manner, the separate cores 66a, 66b, 66c and the base core 64 are combined together into the core assembly 62. The core assembly 62 is disposed on the core assembly holder 42b of the movable die 42 which has been displaced away from the fixed die 44. As shown in FIG. 5, the rotor core 12 is held by the rotor core holder 42a in surrounding relation to the core assembly 62.

In the fixed die 44, the collars 18 are held respectively by the collar holder 44b, and the laminated iron core made of the thin steel sheets 26 is held by the iron core holder 44a.

Figure 6:
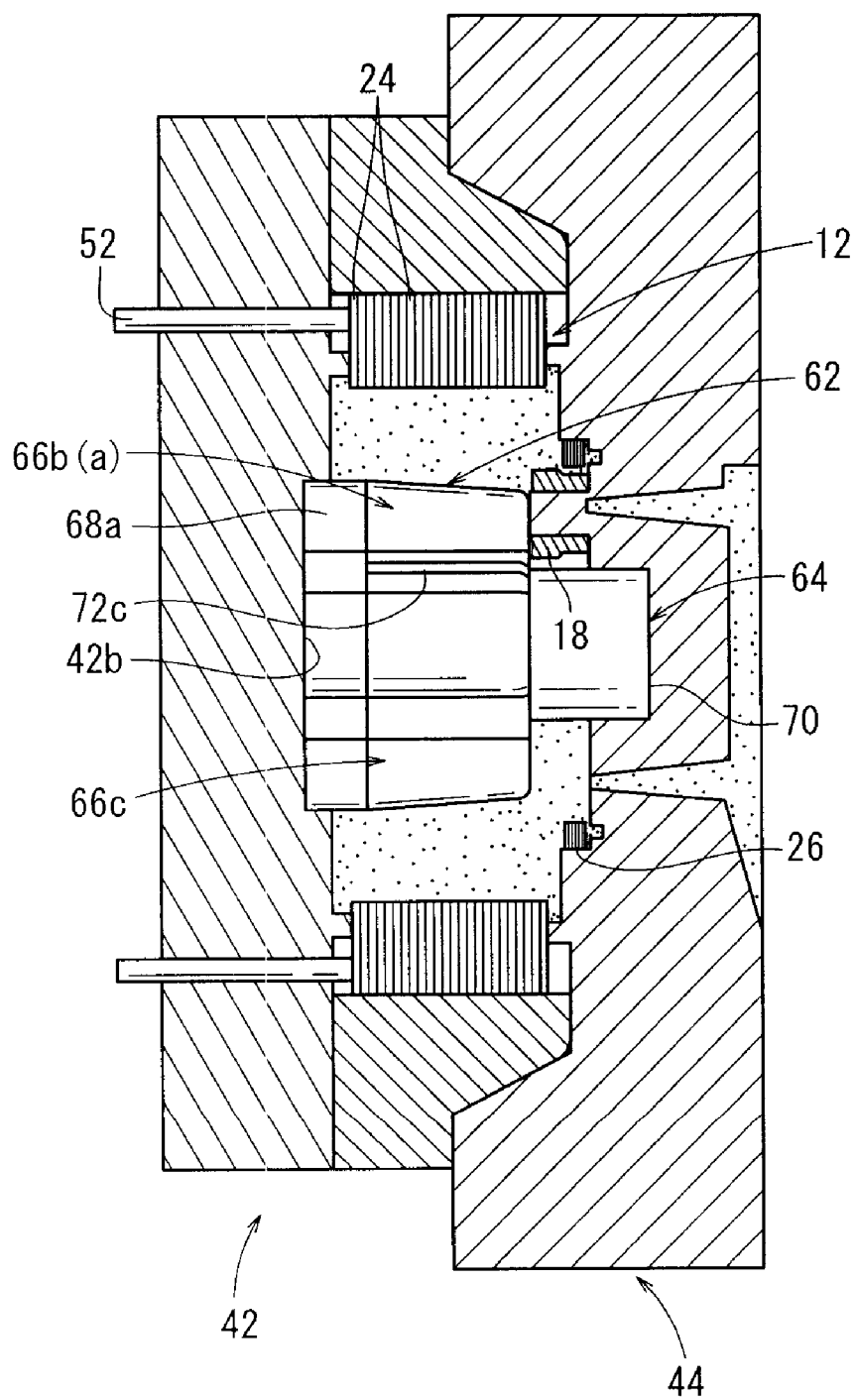
FIG. 6 is a cross-sectional view showing the manner in which the dies of the manufacturing apparatus are clamped and filled with molten aluminum.

Then, as shown in FIG. 3, the movable die base 46 is moved to bring the movable die 42 into abutment against the fixed die 44, forming the casting cavity 60. The movable die 42 and the fixed die 44 are then clamped together. Then, molten aluminum heated at a temperature ranging from 650° C. to 700° C. is introduced from the sprue 56a into the injection sleeve 56. The injection tip 58 is forced into the injection sleeve 56 to press the introduced molten aluminum from the runner 82 through the gates 80 into the casting cavity 60, as shown in FIG. 6.

Figure 7:
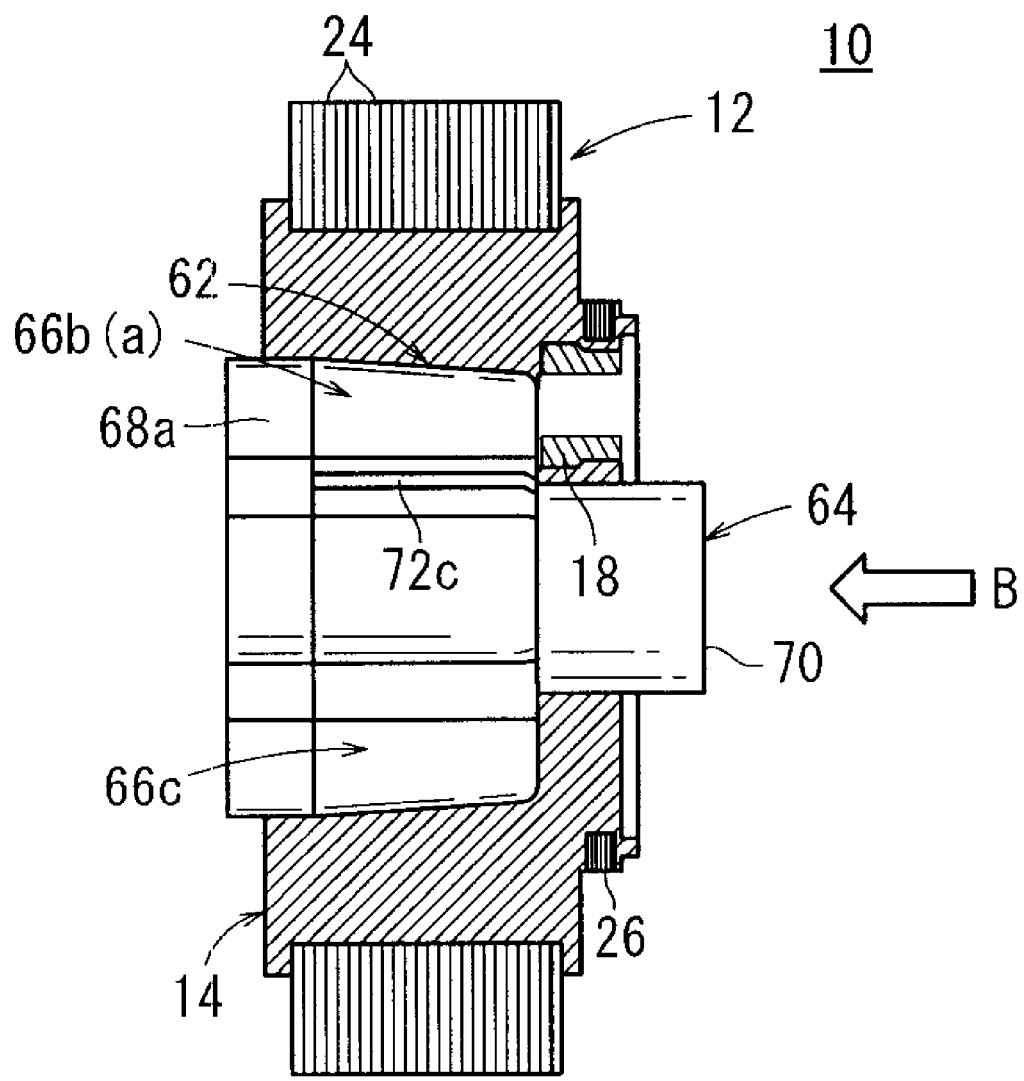
FIG. 7 is a cross-sectional view showing the manner in which the rotor and the core assembly are released from the manufacturing apparatus.

After the molten aluminum which has filled up the casting cavity 60 is solidified at a temperature of about 400° C., the movable die 42 is displaced away from the fixed die 44, thereby opening the die assembly. The solidified aluminum is now in the shape of the rotor 10 as a die casting. The ejector pins 52 are pushed in to release the rotor 10 together with the core assembly 62 at a high temperature from the movable die 42, as shown in FIG. 7.

The rotor 10 and the core assembly 62 are then cooled together by being placed in a water tank, not shown. After the rotor 10 and the core assembly 62 are cooled to a normal temperature, and hence the aluminum is fully solidified, the core assembly 62 is removed. Specifically, as shown in FIG. 7, the support column 70 of the core assembly 62 is pushed in the direction indicated by the arrow B. The base core 64 is now separated and removed from the rotor 10 and the separate cores 66a, 66b, 66c.

When the base core 64 is removed in the direction indicated by the arrow B, the separate cores 66a, 66b, 66c are spaced from each other by a distance corresponding to the thickness of the fins 72a, 72b, 72c. Therefore, the separate cores 66a, 66b, 66c can be displaced radially inwardly in their entirety and hence can easily be released from the rotor 10. Now, the rotor 10 with the boss 14 cast in the rotor core 12 is produced.

As described above, after the rotor 10 is released from the movable die 42 at a high temperature of about 400° C. and then cooled to a normal temperature, the open end 32 of the rotor 10 would tend to shrink radially inwardly. According to the present embodiment, the base core 64 of the core assembly 62 has the correcting surface 68a which is positioned in the open end 32 of the boss 14 and extends in the casting removal direction.

Therefore, when the rotor 10 formed as a die casting is released from the movable die 42, the open end 32 of the boss 14 is reliably prevented from shrinking radially inwardly as the open end 32 is guided by the correcting surface 68a of the core assembly 62 which is also released together with the rotor 10. Therefore, the boss 14 is allowed to keep its accurate cast dimensions. The manufacturing apparatus 40 is thus capable of casting the rotor 10 with high dimensional accuracy efficiently and reliably.

The core assembly 62 includes the base core 64 and the separate cores 66a, 66b, 66c. The base core 64 and the separate cores 66a, 66b, 66c are assembled together when the ridges 74a, 74b, 74c on the fins 72a, 72b, 72c of the base core 64 are fitted in the respective slots 76a, 76b, 76c defined in the separate cores 66a, 66b, 66c. Therefore, the process of assembling the base core 64 and the separate cores 66a, 66b, 66c is highly simplified and made efficient.

For removing the core assembly 62 from the rotor 10, only the base core 64 is initially removed from the rotor 10. Thereafter, the separate cores 66a, 66b, 66c can be removed from the rotor 10. Accordingly, loads required to remove the core assembly 62 are much lower than those necessary to remove a general integral core. The mechanism, not shown, for removing the core assembly 62 from the rotor 10 may thus be reduced in size and cost.

When the base core 64 is removed, the separate cores 66a, 66b, 66c remain spaced from each other. Consequently, it is easy to subsequently remove the separate cores 66a, 66b, 66c from the rotor 10.

The manufacturing apparatus 40 does not need to have the movable die 42 and the fixed die 44 cooled in their entirety to a normal temperature. Therefore, the manufacturing process can be carried out in a short period of time, and the die assembly is prevented from having its service life shortened due to a large temperature difference. The manufacturing apparatus 40 is capable of maintaining the manufactured rotor 10 with high dimensional accuracy.

Although a certain preferred embodiment of the present invention has been shown and described in detail, it should be understood that various changes and modifications may be made therein without departing from the scope of the appended claims.

The invention claimed is:

1. An apparatus for manufacturing a rotor for use in a rotary electric machine by casting a hollow boss radially inwardly of a cylindrical rotor core, comprising:
   a first die for holding the rotor core;
   a second die for defining a cavity between the first die and the second die; and
   a core assembly removably mounted in the first die, for forming the boss, the core assembly including
      a seat including a correcting surface that defines an outer circumferential surface of the seat and a second die surface that faces the second die,
      a support column that extends from the second die surface of the seat toward the second die, and
      a plurality of separate cores radially disposed around the support column,
   wherein the correcting surface of the seat extends in a casting removal direction along which a casting is released so as to contact an inner circumferential surface of an open end of the boss to prevent the open end from being deformed when the casting is released,
   wherein the support column has a plurality of fins extending radially outwardly and in the casting removal direction and aligned with respective mating surfaces of the separate cores, and
   wherein the separate cores are spaced from each other by a distance corresponding to a thickness of the fins.

2. An apparatus according to claim 1, wherein
   the fins have ridges disposed on at least one surface thereof and extending in the casting removal direction;
   the separate cores have slots for receiving the ridges therein, the slots extending in the casting removal direction.

\* \* \* \* \*